United States Patent [19]

Akagawa

[11] Patent Number: 5,588,791
[45] Date of Patent: Dec. 31, 1996

[54] APPARATUS FOR SEQUENTIALLY DELIVERING ARTICLES CONTAINED IN CASSETTES

[75] Inventor: Minoru Akagawa, Fremont, Calif.

[73] Assignee: Intelmatec Corporation, Fremont, Calif.

[21] Appl. No.: 513,275

[22] Filed: Aug. 10, 1995

[51] Int. Cl.[6] .................................................. B65G 1/06
[52] U.S. Cl. ................ 414/331; 198/346.1; 198/803.01; 414/417
[58] Field of Search ................................ 414/331, 417; 198/463.3, 626.1, 429, 346.1, 803.01, 465.1

[56] References Cited

U.S. PATENT DOCUMENTS

| | | | |
|---|---|---|---|
| 1,606,477 | 11/1926 | McClelland | 414/331 |
| 2,661,100 | 12/1953 | Ashford | 414/331 |
| 2,866,564 | 12/1958 | Kuper | 414/331 |
| 3,160,295 | 12/1964 | Roark | 414/331 |
| 4,373,846 | 2/1983 | Charbonnet | 414/331 |
| 4,844,680 | 7/1989 | Kawata et al. | 414/331 |
| 5,181,820 | 1/1993 | Sjogren et al. | 414/331 |
| 5,203,661 | 4/1993 | Tanita et al. | 414/331 |
| 5,360,306 | 11/1994 | Nakayama et al. | 414/331 |
| 5,478,185 | 12/1995 | Kranz | 414/331 |
| 5,501,564 | 3/1996 | Doche | 414/331 |

FOREIGN PATENT DOCUMENTS

| | | | |
|---|---|---|---|
| 247330 | 10/1989 | Japan | 414/331 |
| 290300 | 11/1989 | Japan | 414/331 |
| 188329 | 7/1990 | Japan | 414/331 |
| 8204411 | 6/1984 | Netherlands | 414/331 |

*Primary Examiner*—David A. Bucci
*Attorney, Agent, or Firm*—Majestic, Parsons, Siebert & Hsue

[57] ABSTRACT

An apparatus, for sequentially delivering articles to a specified article-receiving position from each of a plurality of cassettes each containing a plurality of the articles slidably one above another, includes endless chains with cassette-carrying bars attached thereto for longitudinally transporting an array of such cassettes along and above an elongated top plate, an elevator for lifting one cassette at a time, and a pusher assembly for pushing one article at a time from the cassette lifted to a target height by the elevator. The chains are disposed near one side edge of the top plate and the top plate is provided with a transversely extending cut through which the elevator can pass vertically without being interfered with the cables. Guide rails and a roller guide are provided to keep the cassettes horizontally as they are transported longitudinally. Detectors warn an operator when an unloaded cassette comes close to the downstream end of the cables such that the operator has an extended period of time during which unloaded cassettes should be removed and reloaded cassettes should be supplied.

9 Claims, 5 Drawing Sheets

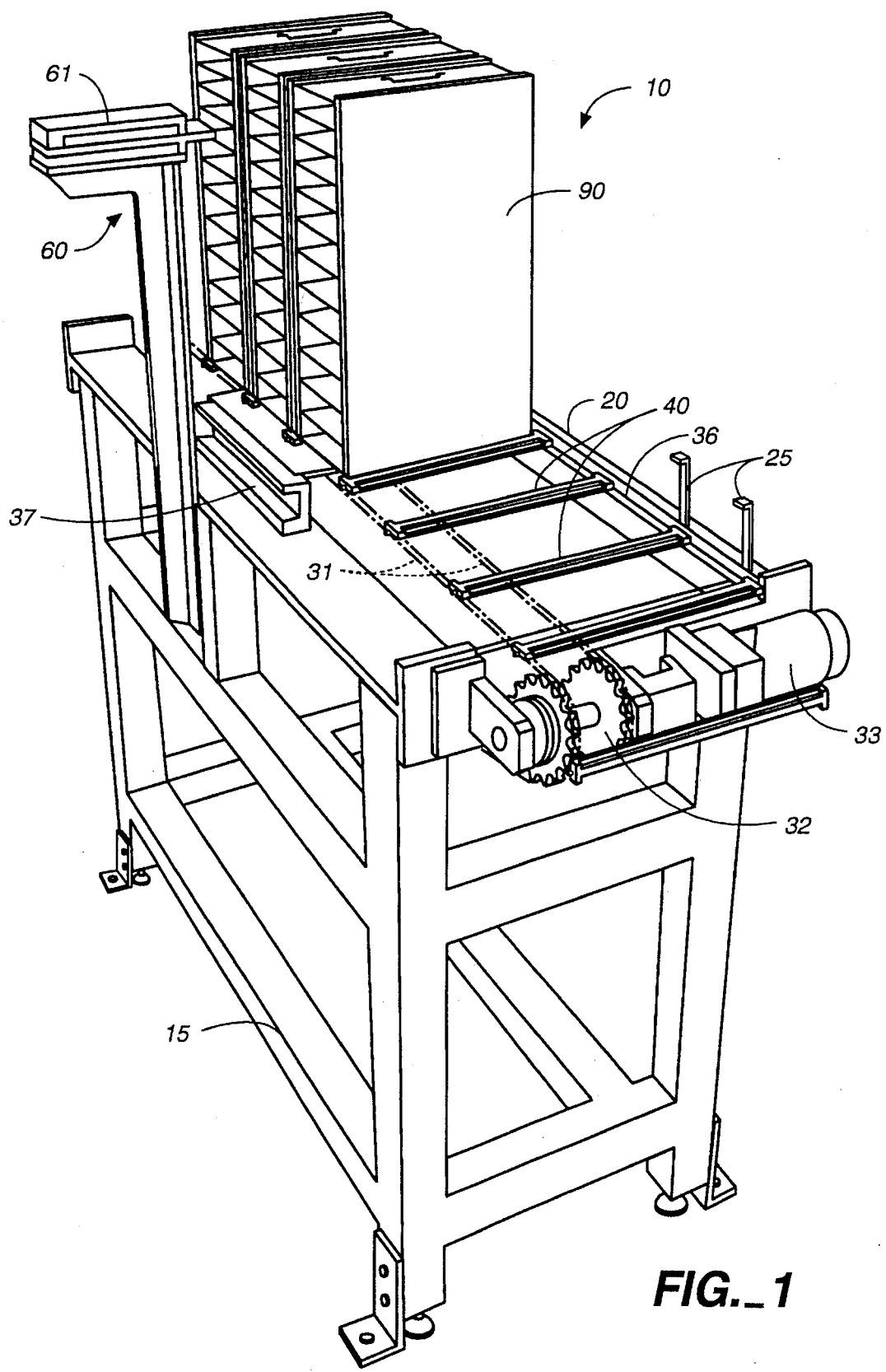
FIG._1

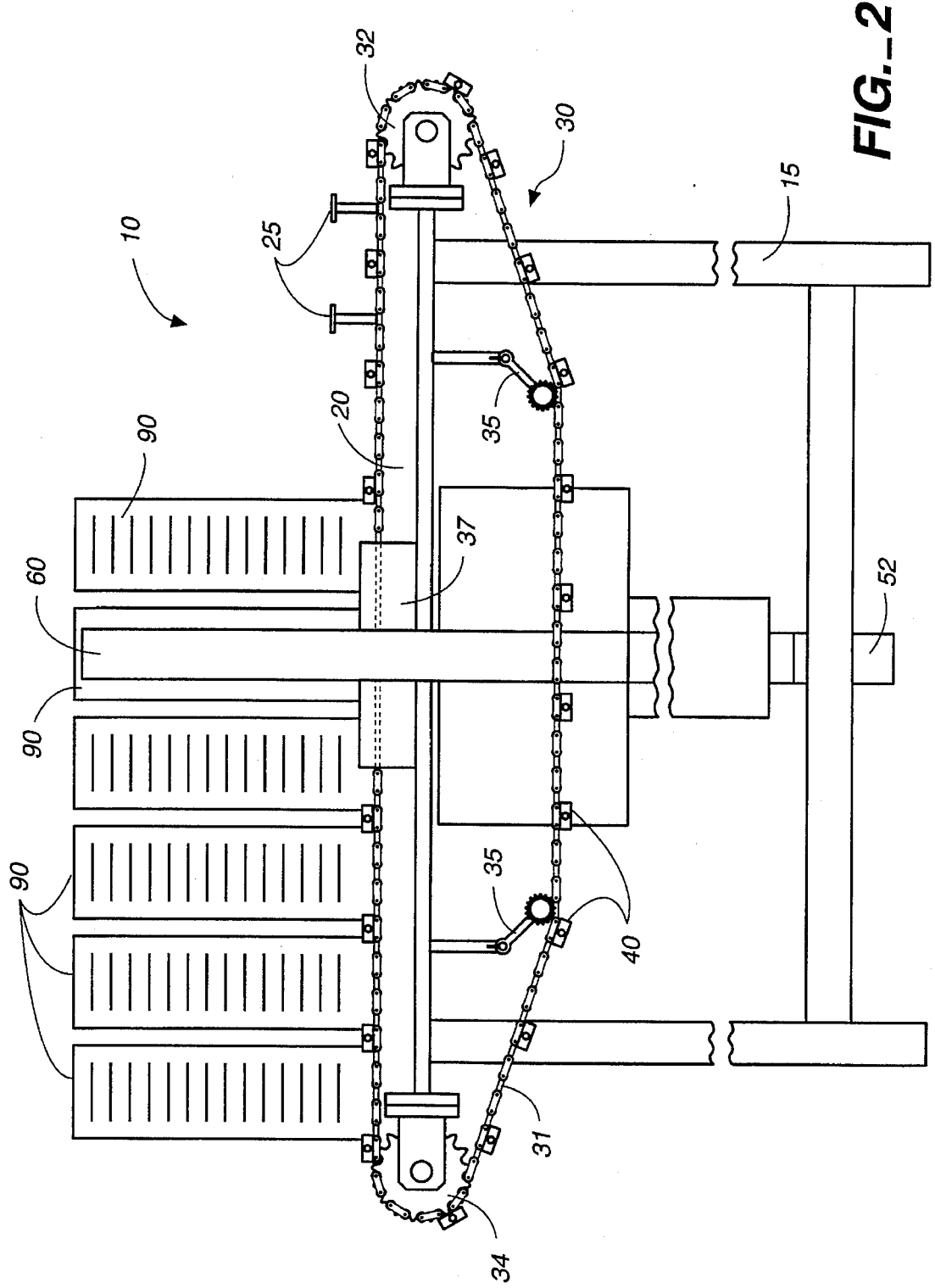
FIG._2

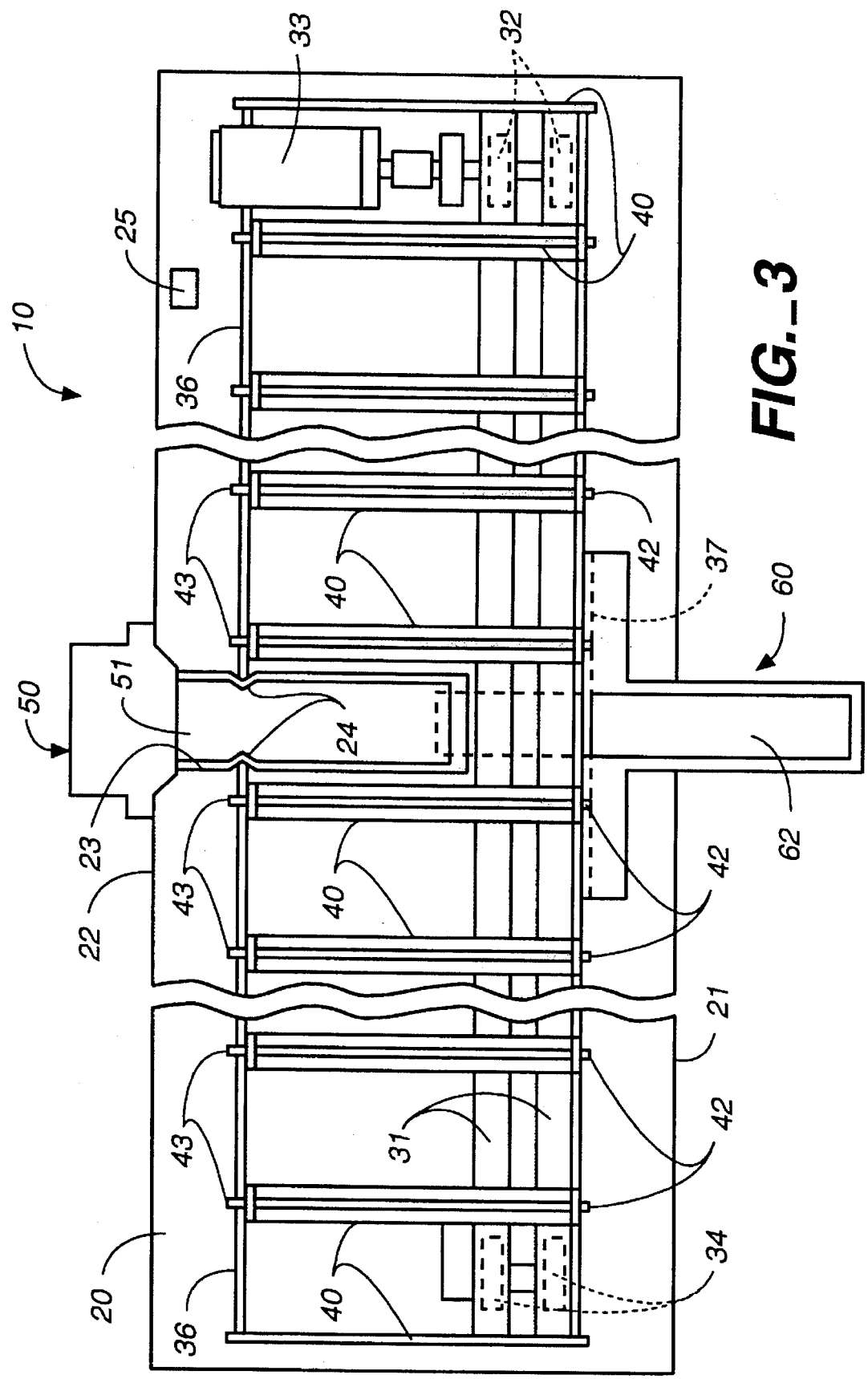

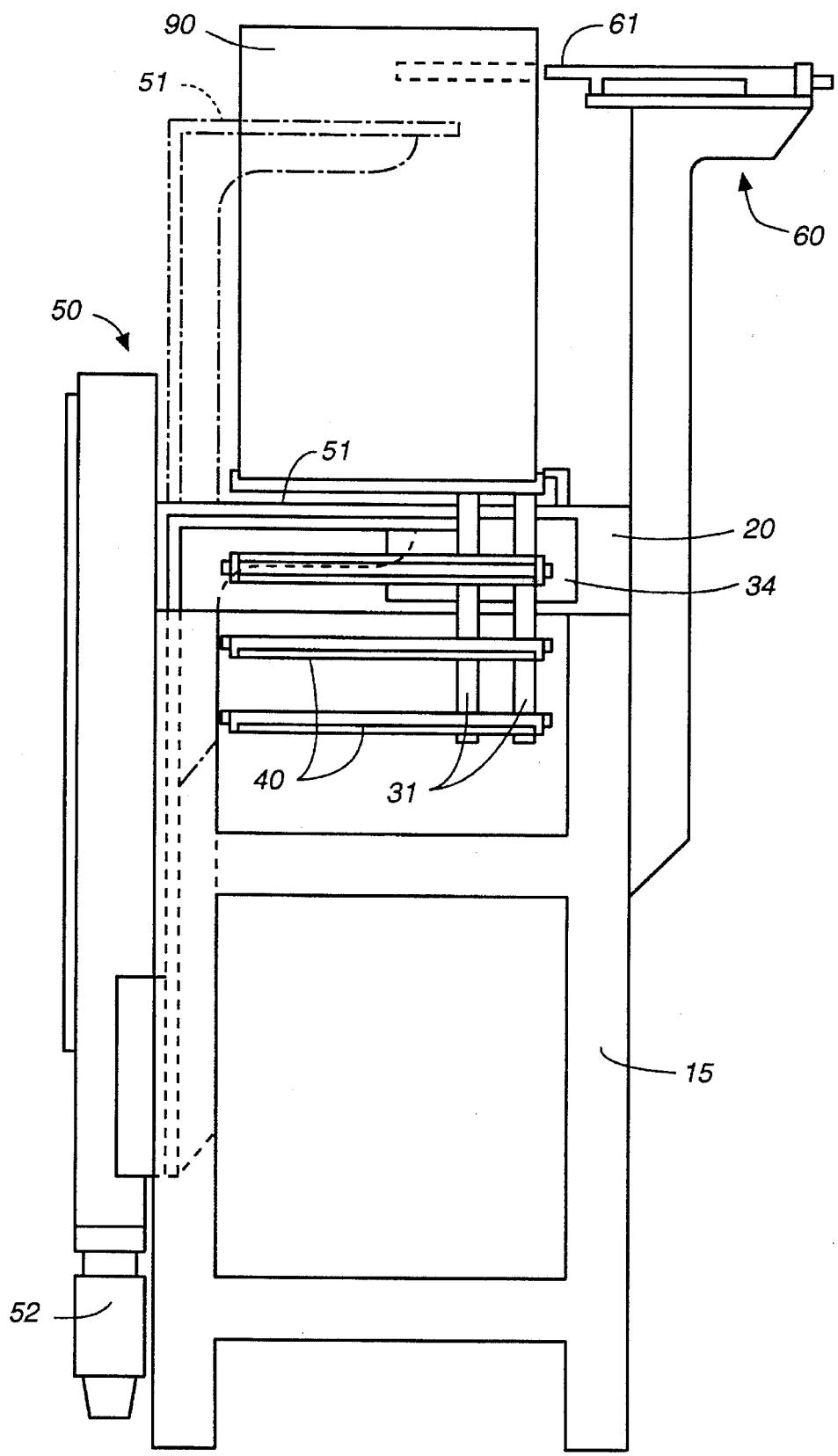
FIG._4

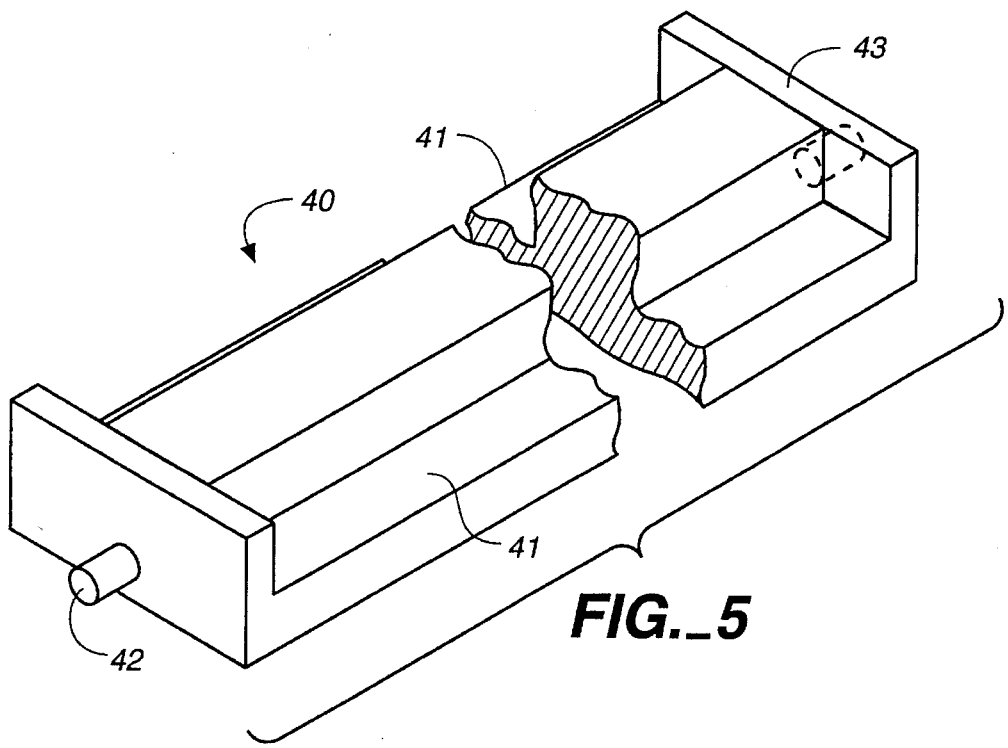
FIG._5
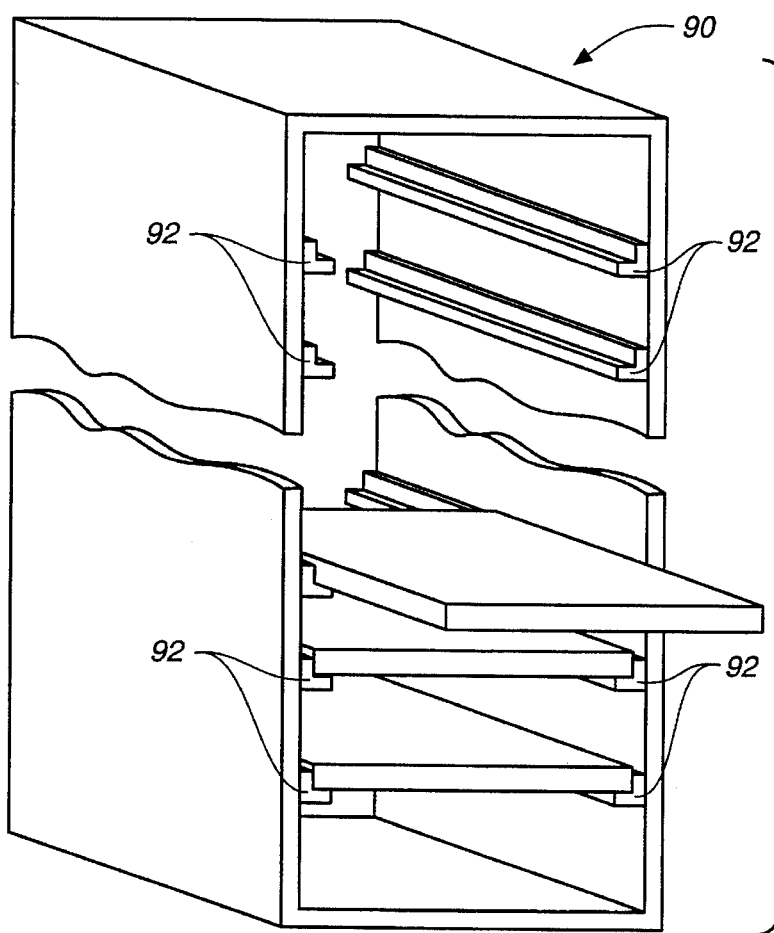
FIG._6
(PRIOR ART)

5,588,791

APPARATUS FOR SEQUENTIALLY DELIVERING ARTICLES CONTAINED IN CASSETTES

BACKGROUND OF THE INVENTION

This invention relates to an apparatus for sequentially delivering articles, such as machine parts or components to be assembled in a production process, which are contained in containers, herein referred to as cassettes, designed to hold these articles one above another in evenly spaced tiers such that they can be pushed individually out of the cassette which contains them.

Work stations, for example, of the type disclosed in U.S. Pat. No. 5,219,215, issued Jun. 15, 1993, are well known and extensively used for the production of many kinds of products, and many different kinds of components to be assembled or otherwise worked on are delivered to a designated article-receiving position of such a work station. One of commonly adopted methods of such delivery has been to make use of a container, frequently referred to as a cassette. As shown as an example in FIG. 6, a cassette 90 may be shaped like a box with open front and back sides. Its vertical side walls are provided with tiers of equally spaced horizontally extending guide members 92 such that articles to be delivered or carriers therefor can be supported thereon by their edges and be pushed horizontally backwards out of the cassette by means of a pusher entering the cassette from the front. After a loaded cassette thus structured is placed next to the article-receiving position (or a lifting position), it is lifted tier by tier in a step-wise vertical motion such that the articles contained in tiers inside the cassette can be sequentially pushed out horizontally backward to the article-receiving position.

Many different schemes have been tried for transporting loaded cassettes to a lifting position adjacent to a designated article-receiving position of a work station. According to a very simple method, they are taken one at a time to the lifting position, from which it is moved vertically upward intermittently such that after each of the articles is pushed out, the next article to be pushed out is brought to the same height as the article-receiving position. This method being far from efficient, two cassettes may be placed one on top of the other at the lifting position so that they can be lifted together continuously and sequentially, but the improvement in efficiency by this method is still not significant. Schemes whereby a plurality of loaded cassettes are arranged horizontally next to one another in a row and moved horizontally together to bring them one at a time to the lifting position have also been considered, but none has been very successful for various reasons. Firstly, each cassette, after horizontally moved to the lifting position, must then be moved vertically. This places a severe limitation on the choice of means for horizontal and vertical motions of the cassettes because interference therebetween must be carefully avoided. In view of this problem, an attempt was made to use a screw rod to move a horizontally arranged array of cassettes, but this gave rise to an efficiency problem of another kind. Let us assume that fully loaded cassettes are adapted to be moved from the left to the right on a horizontal path to the lifting position. After each cassette is completely unloaded, it is lowered back to the original height and is pushed away from the lifting position to the right as the next cassette which is fully loaded is brought to the lifting position. After all the cassettes in the row have thus been unloaded, they are on the right-hand side of the lifting position. Motion of the screw rod is then reversed to return all these unloaded cassettes to the left-hand side of the lifting position where the cassettes are reloaded. In other words, reloading of the cassettes must be carried out at exact moments according to an exact time schedule when the unloaded cassettes are returned to the left-hand side of the lifting position. Otherwise, the efficiency of the production process, in which the apparatus is employed, is significantly affected. This places a severe hardship on the operator in charge of the loading.

SUMMARY OF THE INVENTION

It is therefore an object of the invention to provide an apparatus with improved efficiency for sequentially delivering articles contained in a plurality of cassettes, from which they can be individually pushed out, to a specified article-receiving position, say, of a work station.

It is a more specific object of this invention to provide such an apparatus adapted to transport a plurality of loaded cassettes horizontally.

It is another specific object of this invention to provide such an apparatus which gives more freedom of timing to its operator in removing unloaded cassettes and supplying loaded cassettes.

An apparatus embodying the invention, with which the above and other objects can be accomplished, may be characterized as having endless chains longitudinally stretched over an elongated plate at the top of a frame structure, an elevator assembly and a pusher assembly. Cassette-carrying bars are attached transversely to the chains so as to move therewith. Cassettes are placed in a longitudinal array along the chains through these bars so as to be transported horizontally from an upstream side to the position of the elevator assembly with their bottom edges received in the grooves formed in the bars. The elevator assembly includes an elevator floor for lifting one cassette at a time vertically in a step-wise manner so as to bring each of the articles contained in the cassette to the target height of the article-receiving position. In order to allow the elevator floor to move vertically past the top plate of the frame structure, the top plate is provided with a cut extending from one of its side edges towards, but not reaching, the opposite side edge, and the chains are stretched near the opposite side edge so as not to interfere with the vertical motion of the elevator floor through the cut. In order to keep the cassettes horizontally all the time on the cassette-carrying bars, there are provided guide rails opposite to the chains but with a gap therebetween for allowing the elevator floor to pass therethrough, and a device for engaging with a roller at one end of each cassette-carrying bars as it passes the position of the gap. The elevator floor is moved through the cut in the top plate and through the gap between the guide rails, stopping intermittently to let the pusher assembly push articles sequentially one at a time from the cassette. The cassette, after being completely unloaded, is lowered onto the cassette-carrying bars from which it has been lifted and moved towards the downstream side of the elevator assembly as the next cassette in the array is brought to the position of the elevator assembly. The operator can thus remove unloaded cassettes any time, as long as it is before a detector outputs a warning signal to indicate that one of the unloaded cassettes is about to reach the downstream end of the top plate. Thus, the operator has a finite length of time within which to attend to the removal of unloaded cassettes.

BRIEF DESCRIPTION OF THE DRAWINGS

The accompanying drawings, which are incorporated in and form a part of this specification, illustrate an embodiment of the invention and, together with the description, serve to explain the principles of the invention. In the drawings:

FIG. 1 is a diagonal external view of an apparatus according to this invention with a plurality of cassettes placed thereon;

FIG. 2 is a front view of the apparatus of FIG. 1;

FIG. 3 is a plan view of the apparatus of FIGS. 1 and 2 with the cassettes removed therefrom;

FIG. 4 is a side view of the apparatus of FIGS. 1, 2 and 3 with some components removed for the sake of clarity;

FIG. 5 is a diagonal view of one of the cassette-carrying bars shown in FIGS. 1, 2, 3 and 4; and FIG. 6 is a diagonal view of a prior art cassette which may be used with the apparatus of FIGS. 1, 2, 3 and 4.

DETAILED DESCRIPTION OF THE INVENTION

As shown in FIGS. 1, 2, 3 and 4, an apparatus 10 according to this invention has an elongated rectangular plate (referred to as the top plate) 20 at the top of a frame structure 15, a transporting means 30 for horizontally moving a plurality of cassettes longitudinally above the top plate 20 from its upstream end to its downstream end (to the left and right, respectively, in FIGS. 2 and 3), an elevator assembly 50 for moving the cassettes vertically one at a time, and a pusher assembly 60 for pushing articles out of the cassettes one at a time. Throughout herein, the cassettes are understood to be generally of the structure described above with reference to FIG. 6.

The transporting means 30 includes a pair of endless chains 31 stretched parallel to each other in the direction of elongation (referred to as the longitudinal direction) of the top plate 20 between drive shaft gears 32 attached to the drive shaft of a chain-driving motor 33 at the downstream end and follower gears 34 at the upstream end. Tensioner assemblies 35 of a known kind are provided to adjust the tension of the chains 31 such that the chains 31 have a top section which is stretched substantially horizontally above the top plate 20.

As can be seen more clearly in FIGS. 3 and 4, both endless chains 31 of the pair are positioned near one of the longer side edges (referred to as the first side edge 21) of the rectangularly shaped top plate 20. Longitudinally extending horizontal guide rails 36 are provided near the other longer side edge (referred to as the second side edge 22) of the top plate 20, that is, opposite to the first side edge 21.

A plurality of cassette-carrying bars 40 are attached to the endless chains 31 at uniform intervals therebetween along the chains 31 between each mutually adjacent pair thereof so as to move together longitudinally with the chains 31, extending perpendicularly to the longitudinal direction towards the second side edge 22 of the top plate 20. These bars 40 are for the purpose of carrying the cassettes thereon. For this purpose, each bar 40, as shown in FIG. 5, is provided with a pair of grooves 41 which are mutually parallel and extend lengthwise with respect to the bar 40, that is, perpendicularly to the longitudinal direction in which the chains 31 and the guide rails 36 extend. Each groove 41 is dimensioned for accepting therein a bottom edge of a cassette, and the bars 40 are attached to the chains 31 such that each mutually adjacent pair of the bars 40 can support therebetween one of the cassettes with its bottom edges received in their grooves 41, each bar 40 being capable of supporting bottom edges of two cassettes which will be aligned next to each other above the chains 31.

Rollers 42 and 43 are provided at the ends of each of the cassette-carrying bars 40 so as to be rotatable around an axis in the direction of extension of the bar 40. The roller 43 at the end nearer the second side edge 22 of the top plate 21 is adapted to lie on the guide rail 36. The weight of a cassette, or cassettes, carried by any of the bars 40 tends to push the roller 43 downwards against the guide rail 36 because the center of gravity of each cassette, when properly placed on the bars 40 as intended, will be somewhere between the guide rail 36 and the chains 31. If the chain-driving motor 33 is activated with any number of the cassettes thus placed on the cassette-carrying bars 40, the weights of the cassettes are approximately evenly distributed between and supported by the guide rail 36 and the chains 31. Thus, the cassettes can be transported stably in the longitudinal direction above the top plate 20.

The elevator assembly 50 includes an elevator floor 51 with a flat top surface and an elevator motor 52 for vertically moving the elevator floor 51 upwards so as to cause it to contact the bottom of a cassette thereabove and to lift it by desired vertical distances, depending on the positions of the articles contained in the cassette and the height of the article-receiving position where the articles are to be delivered.

For thus allowing the elevator floor 51 to move vertically, the top plate 20 of the frame structure 15 is provided with a cut 23 nearly at its center in the longitudinal direction, extending from the second side edge 22 towards the first side edge 21, but not reaching where the chains 31 are extended. This cut 23 is provided for allowing the elevator floor 51 to vertically pass therethrough, without hitting the chains 31, and this is why the chains 31 are both disposed close to one of the side edges (that is, along the first side edge 21). As can be seen in FIG. 3, the guide rails 36 have a gap therebetween over the cut 23 so as not to interfere with the vertical motion of the elevator floor 51 through the cut 23 in the top plate 20. In order to allow the cassette-carrying bars 40, and hence the cassettes carried thereon, to remain horizontal as they travel longitudinally above the cut 23, over which the guide rails 36 have a gap, a horizontal roller guide 37 is provided along the first side edge 21 of the top plate 20. The roller guide 37 extends longitudinally over a short distance corresponding to the gap between the guide rails 36 and is adapted to engage with the roller 42 of the bar 40 on the side of the first side edge 21 as the bar 40 travels longitudinally and traverses the cut 23 in the top plate 20 when the other end of the bar 40 (on the side of the second side edge 22) is at the gap between the guide rails 36 and is not receiving any support from below. In other words, the purpose of the roller guide 37 is to prevent the cassette-carrying bar 40 from tilting for lack of support from below by the guide rails 36 as it crosses over the cut 23 (and its roller 43 on the side of the second side edge 22 is at the gap between the guide rails 36), or to prevent the end of the bar 40 on the side of the first side edge 21 from flying upward by the weight of the cassette or cassettes thereon. According to a preferred embodiment of the invention, the cut 23 is shaped with a narrowed portion 24 as shown in FIG. 3, such that the gap between the guide rails 36, and hence also the required length of the roller guide 37, can be made as small as feasible in view of the design of the elevator floor 51 which passes therethrough.

The pusher assembly 60 is for the purpose of pushing an article out of a cassette to a designated target position herein referred to as the article-receiving position. It may therefore be of a known kind, attached to the top plate 20 on its first side edge 21 and having a pusher arm 61 which is thin enough to contact only one of the articles placed one above another inside a cassette without touching the one immediately thereabove or therebelow, and a power source such as an air cylinder 62 for moving the pusher arm 61 horizontally and transversely to the longitudinal direction through a cassette.

The method of using the apparatus 10, as structured above, will be described next in detail. First, the apparatus 10 is set next to a specified article-receiving position such that the center of the second side edge 22 of the top plate 20, where the cut 23 opens, is adjacent to the article-receiving position. The pusher assembly 60 is adjusted such that its pusher arm 61 is at a correct height with respect to the article-receiving position. A plurality of cassettes, fully loaded with articles to be delivered, are placed next to one another in the grooves 41 on mutually adjacent pairs of the cassette-carrying bars 40 on the upstream side of the cut 23. The maximum number of loaded cassettes which can thus be placed on the bars 40 depends on the longitudinal dimension of the apparatus 10.

Next, the chain-driving motor 33 is activated such that the array of cassettes is moved longitudinally, the chains 31 pulling the cassette-carrying bars 40 therewith and the rollers 42 of these bars 40 on the side of the second side edge 21 supported from below by and rolling over the guide rail 36. As the foremost of the cassettes approaches the cut 23, but before the bar 40 supporting its front bottom edge reaches the gap between the guide rails 36, its roller 42 on the side of the first side edge 21 of the top plate 20 engages with the roller guide 37, and the cassette thereon remains horizontal as it moves over the cut 23.

When the foremost one of the cassettes reaches the position above the cut 23, the chain-driving motor 33 is stopped. It will be assumed herein, for the convenience of the explanation, that the designated article-receiving position is somewhat higher than the articles on the top tiers inside the cassettes. Then, the elevator motor 52 is activated such that the elevator floor 51 is raised through the cut 23 until its flat top surface contacts the bottom of the cassette stopped thereabove and further through the gap between the guide rails 36 until the top tier of the cassette reaches the height of the pusher arm 61, or that of the article-receiving position. The elevator motor 52 is then stopped and the air cylinder 62 of the pusher assembly 60 is activated. The pusher arm 61 is thereby pushed forward horizontally, pushing the article at the top tier of the cassette out of the cassette to the desired article-receiving position, without touching any other parts of the cassette.

The pusher arm 61 is immediately retracted to its original position, and the elevator motor 52 is activated again such that the article at the second tier is brought to the height of the pusher arm 61. Thereafter, this process is repeated until all articles are sequentially pushed out of the foremost cassette in the array, and the elevator motor 52 reverses its direction of motion and brings the unloaded cassette down onto the cassette-carrying bars 40 which earlier brought it to the position of the elevator assembly 50.

The chain-driving motor 33 is activated again to move the array of cassettes in the same direction until the second cassette in the array is stopped similarly at the position of the elevator assembly 50. In the meantime, the foremost cassette, which has been unloaded, moves to the downstream side of the elevator assembly 50. The articles loaded in the second cassette are similarly delivered to the article-receiving position sequentially. The same process is repeated until all cassettes in the array are unloaded.

Before all of the cassettes originally loaded and placed on the cassette-carrying bars 40 on the upstream side of the elevator assembly 50 are unloaded, however, any of the cassettes which have been unloaded and are now on the downstream side of the elevator assembly 50 can be removed from the cassette-carrying bars 40 to be reloaded. In other words, the operator in charge of removing unloaded cassettes from the apparatus and placing reloaded cassettes back onto the apparatus does not have to wait until all of the originally placed cassettes are unloaded. According to this invention, there is a freedom of choosing when to remove unloaded cassettes from the apparatus. Detectors 25 of any known kind for detecting the presence of a cassette in front are provided, as shown in FIGS. 1 and 2, longitudinally spaced therebetween by the second side edge 22 near the downstream end of the top plate 20. From the outputs from these detectors 25, the operator can ascertain how urgently unloaded cassettes must be removed from the apparatus 10. For example, if the detector set very close to the downstream end of the top plate 20 outputs a signal indicative of the presence of a cassette in front thereof, this serves as a warning signal that the operator must attend to the removal of cassettes immediately. If only the detector placed at some distance from the downstream end of the top plate 20 outputs a detection signal, on the other hand, the operator will know that there is still some time before it becomes urgent.

The invention has been described above with reference to only one example, but this example is intended to be illustrative, and not limiting. Many modifications and variations are possible within the scope of the invention. Such modifications and variations that may be apparent to a person skilled in the art are intended to be included within the scope of this invention.

What is claimed is:

1. An apparatus for sequentially delivering articles to a specified article-receiving position from each of a plurality of cassettes each containing a plurality of said articles slidably one above another, said apparatus comprising:

a frame with a top plate having longitudinally elongated first and second side edges opposite each other, there being formed a cut through said top plate and extending from a center point along said second side edge towards said first side edge;

endless chains with horizontal parts extending longitudinally along said first side edge above said top plate;

chain-moving means for moving said horizontal parts of said endless chains longitudinally in one direction;

a plurality of cassette-carrying bars extending transversely to said longitudinally elongated top plate with one end attached to said endless chains for carrying said cassettes removably thereon and transporting said cassettes longitudinally above said top plate;

guide rails extending horizontally and longitudinally along said second side edge for supporting the other ends of said cassette-carrying bars;

lifting means adapted to move vertically through said cut in said top plate for lifting said cassettes one at a time; and pushing means for pushing one of said articles horizontally out of one of said cassettes.

2. The apparatus of claim 1 wherein each of said cassette-carrying bars has rollers both at said one end and at said other end, the roller at said one end being capable of rolling over and along said guide rails.

3. The apparatus of claim 1 wherein each of said cassette-carrying bars has mutually parallel grooves for accepting bottom edges of two of said cassettes.

4. The apparatus of claim 1 wherein said pushing means includes a pusher arm capable of pushing only one of said articles disposed one above another at a time and means for moving said pusher arm horizontally and transversely to the direction of said endless chains.

5. The apparatus of claim 1 further comprising detectors for detecting presence of any of said cassettes at end positions on said top plate distal from said center point.

6. The apparatus of claim 1 wherein said guide rails have a gap therebetween over said cut for allowing said lifting means to move vertically through said cut and through said gap.

7. The apparatus of claim 1 wherein said cut has a narrowed portion where said guide rails approach said cut.

8. The apparatus of claim 1 further comprising a roller guide extending horizontally and longitudinally over a limited distance along said first side edge for supporting said one end of said cassette-carrying bar and thereby keeping said cassette-carrying bar to remain horizontal while moving longitudinally over said cut.

9. The apparatus of claim 2 further comprising a roller guide extending horizontally and longitudinally over a limited distance along said first side edge for engaging with the roller at said one end of each of said cassette-carrying bars at least while being over said cut and thereby keeping said cassette-carrying bar horizontally while moving over said cut.

* * * * *